US011869354B2

(12) United States Patent
Park et al.

(10) Patent No.: US 11,869,354 B2
(45) Date of Patent: Jan. 9, 2024

(54) METHOD OF DETECTING ANOMALY OF ROAD SIDE UNIT AND APPARATUS THEREFOR

(71) Applicants: Autocrypt Co., Ltd., Seoul (KR); Penta Security Systems Inc., Seoul (KR)

(72) Inventors: Seung Young Park, Chuncheon-si (KR); Duk Soo Kim, Seoul (KR); Seok Woo Lee, Seoul (KR); Eui Seok Kim, Seoul (KR); Sang Gyoo Sim, Seoul (KR)

(73) Assignees: Autocrypt Co., Ltd., Seoul (KR); Penta Security Systems Inc., Seoul (KR)

( * ) Notice: Subject to any disclaimer, the term of this patent is extended or adjusted under 35 U.S.C. 154(b) by 302 days.

(21) Appl. No.: 17/482,329

(22) Filed: Sep. 22, 2021

(65) Prior Publication Data

US 2022/0092975 A1    Mar. 24, 2022

(30) Foreign Application Priority Data

Sep. 23, 2020  (KR) .................. 10-2020-0122679

(51) Int. Cl.
*G08G 1/09*     (2006.01)
*G08G 1/097*    (2006.01)
*G06N 3/04*     (2023.01)
*G06N 3/08*     (2023.01)
*G08G 1/01*     (2006.01)

(52) U.S. Cl.
CPC ............... *G08G 1/097* (2013.01); *G06N 3/04* (2013.01); *G06N 3/08* (2013.01); *G08G 1/0116* (2013.01); *G08G 1/0125* (2013.01)

(58) Field of Classification Search
CPC .... G08G 1/097; G08G 1/0116; G08G 1/0125; G08G 1/00; G06N 3/04; G06N 3/08; G06N 3/045; G06N 3/088; H04W 4/44; H04W 4/46
See application file for complete search history.

(56) References Cited

U.S. PATENT DOCUMENTS

| 2019/0028862 A1* | 1/2019 | Futaki ................. H04W 4/44 |
| 2020/0137580 A1* | 4/2020 | Yang ................... H04W 12/009 |
| 2020/0334554 A1* | 10/2020 | Takahashi ........... G06F 11/3065 |

* cited by examiner

*Primary Examiner* — Mohamed Barakat
*Assistant Examiner* — Sharmin Akhter
(74) *Attorney, Agent, or Firm* — BROADVIEW IP LAW, PC

(57) ABSTRACT

A method of detecting an anomaly of a road side unit, which is performed by an anomaly detecting apparatus interworking with one or more road side units, may comprise: receiving traffic data from each of the one or more road side units; performing grouping on the one or more road side units based on the traffic data; generating input data of an artificial neural network based on a result of the performing of the grouping; generating output data of the artificial neural network based on the input data; and detecting an anomaly of each of the one or more road side units based on the output data.

12 Claims, 5 Drawing Sheets

METHOD OF DETECTING ANOMALY OF ROAD SIDE UNIT AND APPARATUS THEREFOR

CROSS-REFERENCE TO RELATED APPLICATIONS

This application claims priority to Korean Patent Application No. 10-2020-0122679, filed on Sep. 23, 2020, with the Korean Intellectual Property Office (KIPO), the entire contents of which are hereby incorporated by reference.

BACKGROUND

1. Technical Field

Exemplary embodiments of the present disclosure relate, in general, to a method of detecting an anomaly of a road side unit and an apparatus therefor, and more particularly, to a method of detecting an anomaly of a road side unit based on traffic data and an apparatus therefor.

2. Related Art

Recently, with the development of information and communication technologies, the spread of telematics devices, and the establishment of a ubiquitous environment, an intelligent transport system (ITS) has been studied and widely used. Since such ITS is configured to generate transport data by primarily collecting various types of data for vehicles and then analyzing and processing the vast amounts of collected data, the performance, reliability and accuracy of the intelligent transport system (ITS) vary depending on how accurately the data for the vehicles may be collected. As a result, various studies on technologies and methods for increasing accuracy and efficiency of collection of data for vehicles are being conducted.

In the intelligent transport system, road side units and vehicles may communicate with each other using a vehicle to infrastructure (V2I) method. When the road side unit is attacked, even if a channel environment between an actual road side unit and a vehicle is favorable, the road side unit may change and transmit a signal when transmitting data to the vehicle, which may prevent the vehicle from receiving the corresponding data appropriately. For example, the road side unit may change a pilot signal of the corresponding data. In this case, the vehicle may not smoothly receive the corresponding data. Also, the road side unit may determine that an error has occurred intentionally even though the data has been normally received from the vehicle. In this case, the vehicle may request retransmission of the corresponding data from the road side unit, and additional consumption of radio resources between the road side unit and the vehicle may be inevitable, which may cause a problem that may cause the degradation in the performance of the intelligent transport system.

SUMMARY

Accordingly, exemplary embodiments of the present disclosure are provided to substantially obviate one or more problems due to limitations and disadvantages of the related art.

Exemplary embodiments of the present disclosure provide a method of detecting an anomaly of a road side unit and an apparatus therefor for detecting the anomaly of the road side unit based on traffic data received from one or more road side units having a correlation with each other.

According to an exemplary embodiment of the present disclosure for achieving the above-described objective, a method of detecting an anomaly of a road side unit, which is performed by an anomaly detecting apparatus interworking with one or more road side units, may comprise: receiving traffic data from each of the one or more road side units; performing grouping on the one or more road side units based on the traffic data; generating input data of an artificial neural network based on a result of the performing of the grouping; generating output data of the artificial neural network based on the input data; and detecting an anomaly of each of the one or more road side units based on the output data.

The performing of the grouping on the one or more road side units may include: calculating a distance between the one or more road side units based on the traffic data; and grouping the road side units with the distance, which is less than or equal to a preset value, among the one or more road side units into the same group.

The distance may be one of a linear distance between the road side units and an absolute Pearson correlation distance between the road side units.

The generating of the input data may include: calculating a subset of the grouped road side units among the one or more road side units based on the result of the performing of the grouping; and generating the input data based on the subset.

A size of the input data may be determined based on the number of subsets and a size of the traffic data.

The artificial neural network may be pre-trained.

The artificial neural network may be a convolutional auto encoder (CAE).

The detecting of the anomaly may include: acquiring error values for each of the one or more road side units based on the output data; and detecting an anomaly of each of the one or more road side units by comparing the error values with a preset value.

According to another exemplary embodiment of the present disclosure for achieving the above-described objective, an apparatus for detecting an anomaly of a road side unit may comprise: a processor; a memory configured to store one or more instructions executed by the processor; and an artificial neural network, wherein the one or more instructions are executed to: receive traffic data from each of one or more road side units; perform grouping on the one or more road side units based on the traffic data; generate input data of the artificial neural network based on a result of the performance of the grouping; generate, by the artificial neural network, output data based on the input data; and detect an anomaly of each of the one or more road side units based on the output data.

In the performance of the grouping on the one or more road side units, the one or more instructions may be executed to: calculate a distance between the one or more road side units based on the traffic data; and group the road side units with the distance, which is less than or equal to a preset value, among the one or more road side units into the same group.

The distance may be one of a linear distance between the road side units and an absolute Pearson correlation distance between the road side units.

In the generation of the input data, the one or more instructions may be executed to: calculate a subset of the grouped road side units among the one or more road side units based on the result of the performance of the grouping; and generate the input data based on the subset.

A size of the input data may be determined based on the number of subsets and a size of the traffic data.

The artificial neural network may be pre-trained.

The artificial neural network may be a convolutional auto encoder (CAE).

In the detection of the anomaly, the one or more instructions may be executed to: acquire error values for each of the one or more road side units based on the output data; and detect an anomaly of each of the one or more road side units by comparing the error values with a preset value.

According to the present disclosure, it is possible to improve accuracy and performance of an intelligent transport system by detecting an anomaly of a road side unit based on traffic data received from one or more road side units having a correlation with each other.

In addition, according to the present disclosure, it is possible to detect an anomaly of a road side unit in real time and improve performance of an intelligent transport system by detecting the anomaly of the road side unit using an artificial neural network.

DETAILED DESCRIPTION OF THE EMBODIMENTS

Figure 1:
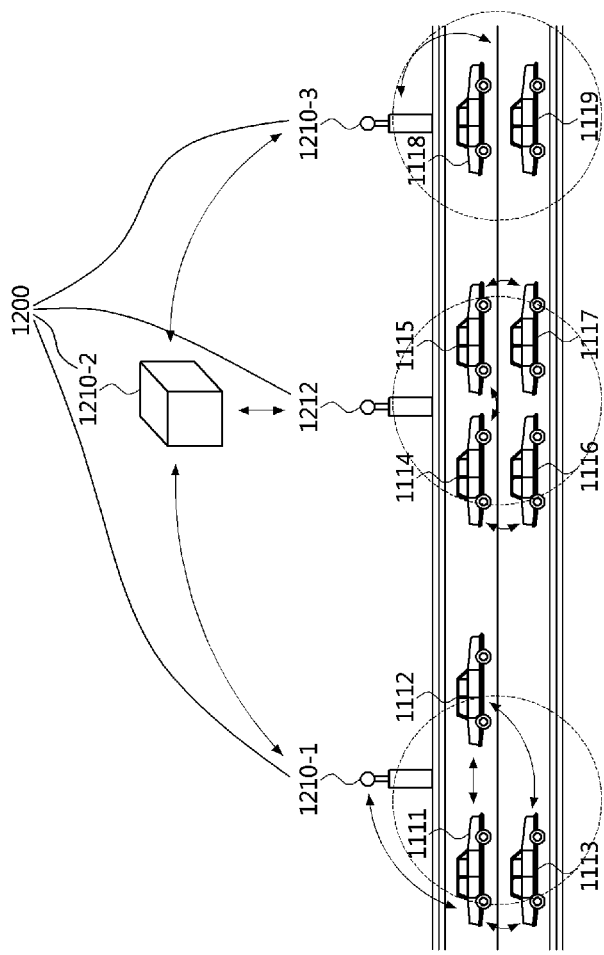
FIG. 1 is a conceptual diagram of a communication system according to an exemplary embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram of a communication system according to an exemplary embodiment of the present disclosure.

Referring to FIG. 1, a communication system 1000 according to the exemplary embodiment of the present disclosure may include one or more vehicles 1111 to 1119 and an intelligent transport system 1200. The intelligent transport system 1200 may include one or more road side units 1210-1 to 1210-3 and an anomaly detection device 1220.

Although only nine vehicles 1111 to 1119 and three road side units 1210-1 to 1210-3 are illustrated in FIG. 1, this is only an example, and the present disclosure is not limited thereto. Each of the one or more vehicles 1111 to 1119 may be present within coverage areas of each of the road side units 1210-1 to 1210-3. For example, the first to third vehicles 1111 to 1113 among the one or more vehicles 1111 to 1119 may be present within a first coverage that is coverage of the first road side unit 1210-1, the fourth to seventh vehicles 1114 to 1117 may be present within a second coverage which is coverage of the second road side unit 1210-2, and the eighth and ninth vehicles 1118 and 1119 may be present within a third coverage that is coverage of the third road side unit 1210-3.

Each of the one or more vehicles 1111 to 1119 may transmit or receive driving data to or from each other using a vehicle-to-vehicle (V2V) communication method. The driving data may include information related to driving of the one or more vehicles 1111 to 1119, such as information on a speed of a vehicle and information on an anomaly of the vehicle.

When a distance between the one or more vehicles 1111 to 1119 is less than a first distance which is a preset distance, each of the one or more vehicles 1111 to 1119 may transmit or receive driving data to or from each other. For example, the distance between the first to third vehicles 1111 to 1113 within the first coverage may be less than the first distance, and each of the first to third vehicles 1111 to 1113 may transmit or receive driving data to or from each other. For example, the distance between the fourth to seventh vehicles 1114 to 1117 within the second coverage may be less than the first distance, and each of the fourth to seventh vehicles 1114 to 1117 may transmit or receive driving data to or from each other. In addition, the distance between the eighth and ninth vehicles 1118 and 1119 within the third coverage may be less than the first distance, and each of the eighth and ninth vehicles 1118 and 1119 may transmit or receive driving data to or from each other. Meanwhile, although not illustrated in FIG. 1, when the distance between the one or more vehicles 1111 to 1119 within different coverage areas is less than the first distance, each of the one or more vehicles 1111 to 1119 may transmit or receive driving data to or from each other. For example, when the distance between the second vehicle 1112 within the first coverage and the fourth vehicle 1114 within the second coverage is less than the first distance, the second vehicle 1112 and the fourth vehicle 1114 may transmit or receive driving data to or from each other.

In addition, each of the one or more vehicles 1111 to 1119 may transmit the driving data to one of the road side units 1210-1 to 1210-3. Each of the one or more vehicles 1111 to 1119 may transmit driving data to one of the road side units 1210-1 to 1210-3 using a vehicle to infrastructure (V2I) communication method. For example, each of the first to third vehicles 1111 to 1113 within the first coverage may transmit driving data to the first road side unit 1210-1. Each of the fourth to seventh vehicles 1114 to 1117 within the second coverage may transmit driving data to the second road side unit 1210-2. In addition, each of the eighth and ninth vehicles 1118 and 1119 within the third coverage may transmit driving data to the third road side unit 1210-3.

In addition, each of the one or more vehicles 1111 to 1119 may receive transport data from the road side units 1210-1 to 1210-3. Each of the one or more vehicles 1111 to 1119 may receive transport data from the road side units 1210-1 to 1210-3 using the V2I communication method. The transport data may include information on whether there is an obstacle on a road, whether there is an accident risk of an adjacent vehicle, and the like. For example, the first to third vehicles 1111 to 1113 within the first coverage may receive transport data from the first road side unit 1210-1. For example, the fourth to seventh vehicles 1114 to 1117 within the second coverage may receive transport data from the second road side unit 1210-2. In addition, the eighth and ninth vehicles 1118 and 1119 within the third coverage may receive transport data from the third road side unit 1210-3. Each of the one or more vehicles 1111 to 1119 may identify a transport situation of a road based on the transport data. For example, each of the one or more vehicles 1111 to 1119 may identify whether an accident has occurred, whether there is an anomaly of surrounding vehicles, and whether there is an anomaly of road conditions, etc. based on the transport data. Each of the one or more vehicles 1111 to 1119 may be controlled based on the transport data. Each of the road side units 1210-1 to 1210-3 may be configured as follows.

Figure 2:
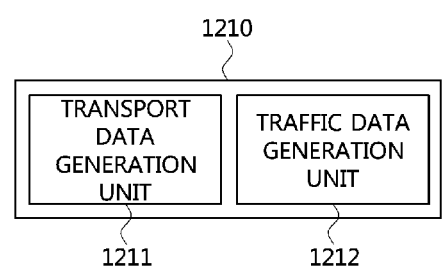
FIG. 2 is a block diagram of a road side unit according to an exemplary embodiment of the present disclosure.

FIG. 2 is a block diagram of a road side unit according to an exemplary embodiment of the present disclosure.

Referring to FIG. 2, a road side unit 1210 may be one of the one or more road side units 1210-1 to 1210-3 in FIG. 1. The road side unit 1210 may include a transport data generation unit 1211 and a traffic data generation unit 1212. The transport data generation unit 1211 may receive driving data from each of the one or more vehicles (for example, one or more vehicles 1111 to 1119 in FIG. 1). The transport data generation unit 1211 may receive driving data from one or more vehicles through an uplink. For example, when the road side unit 1210 is a first road side unit (for example, first road side unit 1210-1 in FIG. 1), the transport data generation unit 1211 may receive driving data from first to third vehicles (for example, the first to third vehicles 1111 to 1113 in FIG. 1) within the first coverage. When the road side unit 1210 is a second road side unit (for example, the second road side unit 1210-2 in FIG. 1), the transport data generation unit 1211 may receive driving data from fourth to seventh vehicles (for example, the fourth to seventh vehicles 1114 to 1117 in FIG. 1) within the second coverage. When the road side unit 1210 is a third road side unit (for example, the third road side unit 1210-3 in FIG. 1), the transport data generation unit 1211 may receive driving data from eighth and ninth vehicles (for example, the eighth and ninth vehicles 1118 to 1119 in FIG. 1) within the third coverage.

The transport data generation unit 1211 may generate transport data based on the driving data. For example, when the road side unit 1210 is the first road side unit, the transport data generation unit 1211 may generate first transport data based on the driving data received from each of the first to third vehicles. The first transport data may be transport data for the first coverage. When the road side unit 1210 is the second road side unit, the transport data generation unit 1211 may generate second transport data based on the driving data received from each of the fourth to seventh vehicles. The second transport data may be transport data for the second coverage. In addition, when the road side unit 1210 is the third road side unit, the transport data generation unit 1211 may generate third transport data based on the driving data received from the eighth and ninth vehicles. The third transport data may be transport data for the third coverage.

The transport data generation unit 1211 may transmit transport data to one or more vehicles. The transport data generation unit 1211 may transmit transport data to one or more vehicles through a downlink. The one or more vehicles may be vehicles that are present within coverage of the road side unit. For example, when the road side unit 1210 is the first road side unit, the transport data generation unit 1211 may transmit the first transport data to the first to third vehicles. When the road side unit 1210 is the second road side unit, the transport data generation unit 1211 may transmit the second transport data to the fourth to seventh vehicles. In addition, when the road side unit 1210 is the third road side unit, the transport data generation unit 1211 may transmit the third transport data to the eighth and ninth vehicles.

The traffic data generation unit 1212 may acquire, from the transport data generation unit 1211, the number of times the transport data generation unit 1211 receives driving data from one or more vehicles every first cycle. For example, the first cycle may be 10 minutes. The traffic data generation unit 1212 may acquire, from the transport data generation unit 1211, the number of times the transport data generation unit 1211 receives driving data from one or more vehicles between 0 and 10 minutes. In addition, the traffic data generation unit 1212 may acquire, from the transport data generation unit 1211, the number of times the driving data is received from one or more vehicles between 10 and 20 minutes. In this way, the traffic data generation unit 1212 may acquire, from the transport data generation unit 1211, the number of times driving data is received from one or more vehicles between n and n+10 minutes. When the road side unit 1210 is the first road side unit, the traffic data generation unit 1212 may acquire the number of times the transport data generation unit 1211 receives driving data from the first to third vehicles every first cycle. When the road side unit 1210 is the second road side unit, the traffic data generation unit 1212 may acquire the number of times the transport data generation unit 1211 receives driving data from the fourth to seventh vehicles every first cycle. In addition, when the road side unit 1210 is the third road side unit, the traffic data generation unit 1212 may acquire the number of times the transport data generation unit 1211 receives driving data from the eighth and ninth vehicles every first cycle.

The traffic data generation unit 1212 may acquire the number of times the driving data is received for each modulation coding scheme (MCS) level based on the information on the number of times the driving data is received. The traffic data generation unit 1212 may acquire the number of times the driving data is received for each MCS level in a method of classifying the number of times the driving data is received for each MCS level. The number of times the driving data is received for each MCS level may be represented by the following Equation 1.

$$n_i^u(t)=[n_{i0}^u(t) \ldots n_{i(K_u-1)}^u(t)]^T \qquad \text{[Equation 1]}$$

In Equation 1, $n_i^u(t)$ may denote the number of times the driving data is received for each MCS level, i may denote a type of the road side unit 1210, and $K_u$ may denote the number of vehicles within the coverage of the road side unit 1210. For example, when the road side unit 1210 is the first road side unit, i may be 1, and $K_u$ may be 3. When the road side unit 1210 is the second road side unit, i may be 2, and $K_u$ may be 4. In addition, when the road side unit 1210 is the third road side unit, i may be 3, and $K_u$ may be 2.

When the transport data generation unit 1211 receives driving data from one or more vehicles every first cycle, the traffic data generation unit 1212 may acquire, from the transport data generation unit 1211, a probability of occurrence of a reception error. For example, when the transport data generation unit 1211 receives the driving data from one or more vehicles between 0 and 10 minutes, the traffic data generation unit 1212 may acquire, from the transport data generation unit 1211, the probability of occurrence of the reception error. In addition, when the transport data generation unit 1211 receives the driving data from one or more vehicles between 10 and 20 minutes, the traffic data generation unit 1212 may acquire, from the transport data generation unit 1211, the probability of occurrence of the reception error. In this way, when the transport data generation unit 1211 receives the driving data from one or more vehicles between n and n+10 minutes, the traffic data generation unit 1212 may acquire, from the transport data generation unit 1211, the probability of occurrence of the reception error.

When the road side unit 1210 is the first road side unit, the traffic data generation unit 1212 may acquire the probability of occurrence of the reception error that occurs when the transport data generation unit 1211 receives the driving data from the first to third vehicles every first cycle. When the road side unit 1210 is the second road side unit, the traffic data generation unit 1212 may acquire the probability of occurrence of the reception error that occurs when the transport data generation unit 1211 receives the driving data from the fourth to seventh vehicles every first cycle. In addition, when the road side unit 1210 is the third road side unit, the traffic data generation unit 1212 may acquire the probability of occurrence of the reception error that occurs when the transport data generation unit 1211 receives the driving data from the eighth and ninth vehicles every first cycle.

The traffic data generation unit 1212 may acquire the probability of occurrence of the reception error for each MCS level based on the probability of occurrence of the reception error. The traffic data generation unit 1212 may acquire the probability of occurrence of the reception error for each MCS level in a way of classifying the probability of occurrence of the reception error for each MCS level. The probability of occurrence of the reception error for each MCS level may be represented by the following Equation 2.

$$p_i^u(t)=[p_{i0}^u(t) \ldots p_{i(K_u-1)}^u(t)]^T \qquad \text{[Equation 2]}$$

In Equation 2, $p_i^u(t)$ may denote the probability of occurrence of the reception error for each MCS level. The traffic data generation unit 1212 may acquire, from the transport data generation unit 1211, a reception delay value, a throughput, and a packet loss that occur when the transport data generation unit 1211 receives the driving data from one or more vehicles every first cycle. The traffic data generation unit 1212 may acquire a reception delay value, a throughput, and a packet loss that occur when the transport data generation unit 1211 receives the driving data from one or more vehicles between 0 and 10 minutes. In addition, the traffic data generation unit 1212 may acquire, from the transport data generation unit 1211, a reception delay value, a throughput, and a packet loss that occur when the transport data generation unit 1211 receives the driving data from one or more vehicles between 10 and 20 minutes. In this way, the traffic data generation unit 1212 may acquire, from the transport data generation unit 1211, a reception delay value, a throughput, and a packet loss that occur when the transport data generation unit 1211 receives the driving data from one or more vehicles between n and n+10 minutes.

For example, when the road side unit 1210 is the first road side unit, the traffic data generation unit 1212 may acquire a reception delay value, a throughput, and a packet loss that occur when the transport data generation unit 1211 receives the driving data from the first to third vehicles every first cycle. When the road side unit 1210 is the second road side unit, the traffic data generation unit 1212 may acquire a reception delay value, a throughput, and a packet loss that occur when the transport data generation unit 1211 receives the driving data from the fourth to seventh vehicles every first cycle. In addition, when the road side unit 1210 is the third road side unit, the traffic data generation unit 1212 may acquire a reception delay value, a throughput, and a packet loss that occur when the transport data generation unit 1211 receives the driving data from the eighth and ninth vehicles every first cycle.

The traffic data generation unit 1212 may acquire, from the transport data generation unit 1211, the number of times the transport data generation unit 1211 transmits transport data to one or more vehicles every first period. For example, the traffic data generation unit 1212 may acquire, from the transport data generation unit 1211, the number of times the transport data generation unit 1211 transmits transport data to one or more vehicles between 0 and 10 minutes. In addition, the traffic data generation unit 1212 may acquire, from the transport data generation unit 1211, the number of times the transport data generation unit 1211 transmits transport data to one or more vehicles between 10 and 20 minutes. In this way, the traffic data generation unit 1212 may acquire, from the transport data generation unit 1211, the number of times the transport data generation unit 1211 transmits transport data to one or more vehicles between n and n+10 minutes.

When the road side unit 1210 is the first road side unit, the traffic data generation unit 1212 may acquire the number of times the transport data generation unit 1211 transmits the transport data to the first to third vehicles every first period. When the road side unit 1210 is the second road side unit, the traffic data generation unit 1212 may acquire the number of times the transport data generation unit 1211 transmits the transport data to the fourth to seventh vehicles every first period. In addition, when the road side unit 1210 is the third road side unit, the traffic data generation unit 1212 may acquire the information on the number of times the transport data generation unit 1211 transmits the transport data to the eighth to ninth vehicles every first period.

The traffic data generation unit 1212 may acquire the number of times the transport data is transmitted for each MCS level based on the number of times the driving data is transmitted. The traffic data generation unit 1212 may acquire the number of times the transport data is transmitted for each MCS level in a way of classifying the number of times the transport data is transmitted for each MCS level. The number of times the driving data is transmitted for each MCS level may be represented by the following Equation 3.

$$n_i^d(t) = [n_{i0}^d(t) \ldots n_{i(K_d-1)}^d(t)]^T \quad \text{[Equation 3]}$$

In Equation 3, $n_i^d(t)$ may denote the number of times the driving data is transmitted for each MCS level. When the transport data generation unit 1211 transmits transport data to one or more vehicles every first period, the traffic data generation unit 1212 may acquire, from the transport data generation unit 1211, a probability of occurrence of a transmission error. For example, when the transport data generation unit 1211 transmits transport data to one or more vehicles between 0 and 10 minutes, the traffic data generation unit 1212 may acquire, from the transport data generation unit 1211, the probability of occurrence of the transmission error. In addition, when the transport data generation unit 1211 transmits transport data to one or more vehicles between 10 and 20 minutes, the traffic data generation unit 1212 may acquire, from the transport data generation unit 1211, the probability of occurrence of the transmission error. In this way, when the transport data generation unit 1211 transmits transport data to one or more vehicles between n and n+10 minutes, the traffic data generation unit 1212 may acquire, from the transport data generation unit 1211, the probability of occurrence of the transmission error.

When the road side unit 1210 is the first road side unit, the traffic data generation unit 1212 may acquire the probability of occurrence of the transmission error that occurs when the transport data generation unit 1211 transmits transport data to the first to third vehicles every first period. When the road side unit 1210 is the second road side unit, the traffic data generation unit 1212 may acquire the probability of occurrence of the transmission error that occurs when the transport data generation unit 1211 transmits transport data to the fourth to seventh vehicles every first period. In addition, when the road side unit 1210 is the third road side unit, the traffic data generation unit 1212 may acquire the probability of occurrence of the transmission error that occurs when the transport data generation unit 1211 transmits transport data to the eighth and ninth vehicles every first period.

The traffic data generation unit 1212 may acquire the probability of occurrence of the transmission error for each MCS level based on the probability of occurrence of the transmission error. The traffic data generation unit 1212 may acquire the probability of occurrence of the transmission error for each MCS level in a way of classifying the probability of occurrence of the transmission error for each MCS level. The probability of occurrence of the transmission error for each MCS level may be represented by the following Equation 4.

$$p_i^d(t) = [p_{i0}^d(t) \ldots p_{i(K_d-1)}^d(t)]^T \quad \text{[Equation 4]}$$

$p_i^d(t)$ may denote the probability of occurrence of the transmission error for each MCS level. The traffic data generation unit 1212 may acquire the actual number of vehicles that perform communication with the transport data generation unit every first period. Meanwhile, since the transport data generation unit and the vehicles within the coverage perform communication based on an anonymous certificate, the traffic data generation unit 1212 may acquire the actual number of vehicles based on the time (or ratio) that the transport data generation unit performed communication between vehicles within the coverage based on the anonymous certificate. The traffic data generation unit 1212 may acquire the actual number of vehicles using the following Equation 5.

Actual number of vehicles=(Last communication time−First communication time)/Unit time interval  [Equation 5]

In Equation 5, the unit time interval may denote the first cycle. For example, when the unit time interval is 10 minutes, the first road side unit and the first vehicle perform communication with each other for 0 to 10 minutes, the second vehicle performs communication for 0 to 5 minutes, and the third vehicle performs communication for 0 to 10 minutes, the actual number of vehicles may be 2.5 which is 1+0.5+1.

The traffic data generation unit 1212 may acquire, from the transport data generation unit 1211, a transmission delay value, a throughput, and a packet loss that occur when the transport data generation unit 1211 transmits transport data to one or more vehicles every first period. For example, the traffic data generation unit 1212 may acquire, from the transport data generation unit 1211, a transmission delay value, a throughput, and a packet loss that occurs when the transport data generation unit 1211 transmits transport data to one or more vehicles between 0 and 10 minutes. In addition, the traffic data generation unit 1212 may acquire, from the transport data generation unit 1211, a transmission delay value, a throughput, and a packet loss that occurs when the transport data generation unit 1211 transmits transport data to one or more vehicles between 10 and 20 minutes.

When the road side unit 1210 is the first road side unit, the traffic data generation unit 1212 may acquire a transmission delay value, a throughput, and a packet loss that occur when the transport data generation unit 1211 transmits transport data to the first to third vehicles every first period. When the road side unit 1210 is the second road side unit, the traffic data generation unit 1212 may acquire a transmission delay value, a throughput, and a packet loss that occur when the transport data generation unit 1211 transmits transport data to the fourth to seventh vehicles every first period. In addition, when the road side unit 1210 is the third road side unit, the traffic data generation unit 1212 may acquire a transmission delay value, a throughput, and a packet loss that occur when the transport data generation unit 1211 transmits transport data to the eighth and ninth vehicles every first period. The traffic data generation unit 1212 may generate traffic data based on the values acquired from the transport data generation unit 1211. The traffic data may be represented by the following Equation 6.

$$x_i(t)=[(n_i^d(t))^T(\tilde{n}_i^d(t))^T(n_i^u(t))^T(\tilde{n}_i^u(t))^T(p_i^d(t))^T(\tilde{p}_i^d(t))^T \\ (p_i^u(t))^T(\tilde{p}_i^u(t))^T z_i^d(t) \tilde{z}_i^d(t) z_i^u(t) \tilde{z}_i^u(t) r_i^d(t) \tilde{r}_i^d(t) r_i^u \\ (t) \tilde{r}_i^u(t) l_i^d(t) \tilde{l}_i^d(t) l_i^u(t) \tilde{l}_i^u(t) v_i(t) \tilde{v}_i(t) g(t)]$$ [Equation 6]

In Equation 6, $x_i(t)$ may denote traffic data, $z_i^d(t)$ may denote a transmission error value, $z_i^u(t)$ may denote a reception error value, $r_i^d(t)$ may denote the throughput that occurs when the transport data generation unit 1211 transmits the transport data to one or more vehicles, $r_i^u(t)$ may denote the throughput that occurs when the transport data generation unit 1211 receives the driving data from one or more vehicles, $l_i^d(t)$ may denote the packet loss that occurs when the transport data generation unit 1211 transmits the transport data to one or more vehicles, $l_i^u(t)$ may denote the packet loss that occurs when the transport data generation unit 1211 receives the driving data from one or more vehicles, and $v_i(t)$ may denote the number of vehicles that substantially perform communication with the transport data generation unit every first period.

The traffic data generation unit 1212 may consecutively generate traffic data every first period. For example, the traffic data generation unit 1212 may generate the traffic data between 0 and 10 minutes and the traffic data between 10 and 20 minutes. In this way, the traffic data generation unit 1212 may generate the traffic data between n and n+10 minutes.

The traffic data generation unit 1212 may transmit the traffic data to the anomaly detection device (for example, anomaly detection device 1220 in FIG. 1). For example, when the road side unit 1210 is the first road side unit, the transport data generation unit 1212 may transmit the first transport data to the first to third vehicles. When the road side unit 1210 is the second road side unit, the transport data generation unit 1212 may generate the second transport data and transmit the generated second transport data to the anomaly detection device. When the road side unit 1210 is the third road side unit, the traffic data generation unit 1212 may generate the third traffic data and transmit the generated third traffic data to the anomaly detection device.

Referring back to FIG. 1, the anomaly detection device 1220 may receive the traffic data from the road side units 1210-1 to 1210-3. The anomaly detection device 1220 may receive the first traffic data from the first road side unit 1210-1, receive the second traffic data from the second road side unit 1210-2, and receive the third traffic data from the third road side unit 1210-3. The anomaly detection device 1220 may be configured as follows.

Figure 3:
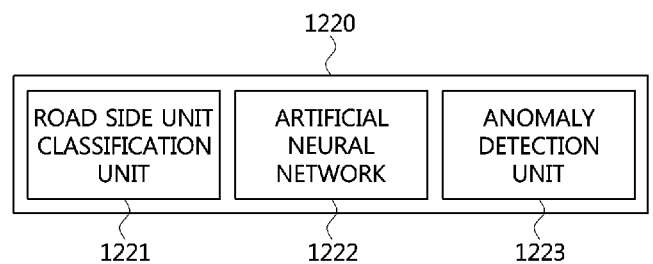
FIG. 3 is a block diagram of an anomaly detection device according to an exemplary embodiment of the present disclosure.

FIG. 3 is a block diagram of an anomaly detection device according to an exemplary embodiment of the present disclosure.

Referring to FIG. 3, the configuration of the anomaly detection device 1220 may be the same as or similar to that of the anomaly detection device 1220 in FIG. 1. The anomaly detection device 1220 may include a road side unit classification unit 1221, an artificial neural network 1222, and an anomaly detection unit 1223. The road side unit classification unit 1221 may calculate an absolute Pearson correlation distance between the road side units 1210-1 to 1210-3 based on the traffic data received from each of the road side units (for example, the road side units 1210-1 to 1210-3 in FIG. 1). The road side unit classification unit 1221 may calculate the absolute Pearson correlation distance between the road side units 1210-1 to 1210-3 based on the following Equation 7.

$$d_{(i,j)} = \sum_m w_m \left( 1 - \left| \frac{\Sigma_t (x_{im}(t) - \mu_{im})(x_{jm}(t) - \mu_{jm})}{\sqrt{\Sigma_t (x_{im}(t) - \mu_{im})^2} \sqrt{(x_{jm}(t) - \mu_{jm})^2}} \right| \right)$$ [Equation 7]

In Equation 7, $d(i,j)$ may denote an absolute Pearson correlation distance between an $i^{th}$ road side unit and a $j^{th}$ road side unit, ωm may denote a weight of an $m^{th}$ value among values included in traffic data, $x_{im}(t)$ may denote an $m^{th}$ value among values included in traffic data received from the $i^{th}$ road side unit, $\mu_{im}$ may denote an average value of $x_{im}(t)$, $x_{jm}(t)$ may denote an $m^{th}$ value among values included in traffic data received from the $j^{th}$ road side unit, and $\mu_{jm}$ may denote an average value of $x_{jm}(t)$ and may be represented by the following Equation 8.

$$\mu_{im} = \frac{1}{T} \sum_{t=0}^{T-1} x_{im}(t)$$ [Equation 8]

In Equation 8, T may denote the number of pieces of traffic data received from the same road side unit. T may be the number of periods in which the traffic data is received. For example, when the road side unit classification unit 1221 calculates the absolute Pearson correlation distance between the first road side unit and the second road side unit based on the first traffic data received from the first road side unit and the second traffic data received from the second road side unit, i may be 1, and j may be 2. When the absolute Pearson correlation distance is calculated based on the traffic data of the above Equation 7, m may be 10. In addition, when the road side unit classification unit 1221 receives A traffic data from the same road side unit, T may be A. For example, when the road side unit classification unit 1221 receives traffic data for about 30 days, three hours a day, with a first cycle of ten minutes, A may be 540.

The road side unit classification unit 1221 may group the road side units based on the absolute Pearson correlation distance. The road side unit classification unit 1221 may group the road side units into the same group when the absolute Pearson correlation distance between the road side units is less than the second distance, and group road side units having a $k^{th}$ smallest absolute Pearson correlation distance into the same group. When the distance between the road side units is less than the second distance, or the road side units are the road side units having the $k^{th}$ smallest absolute Pearson correlation distance, characteristics of traffic data may be similar. For example, when the absolute Pearson correlation distance of the first road side unit and the second road side unit is 5, the distance between the first road side unit and the third road side unit is 15, the distance between the second road side unit and the third road side unit is 10, and the second distance is 7, the road side unit classification unit 1221 may group the first road side unit and the second road side unit into a first group, and the third road into a second group. In addition, when the absolute Pearson correlation distance of the first road side unit and the second road side unit is 10, the distance between the first road side unit and the third road side unit is 15, the distance between the second road side unit and the third road side unit is 5, and k is 3, the road side unit classification unit 1221 may group the first road side unit, the second road side unit, and the third road side unit into a first' group. Alternatively, the road side unit classification unit 1221 may perform grouping based on a physical distance between the road side units, not based on the absolute Pearson correlation distance. When the road side unit classification unit 1221 performs grouping based on the physical distance, the grouping may be performed by the same method as the method of performing the grouping based on the absolute Pearson correlation distance.

The road side unit classification unit 1221 may acquire a subset for each group based on the result of performing grouping. For example, when the first road side unit and the second road side unit are the first group and when the third road side unit is the second group, the road side unit classification unit 1221 may acquire a subset such as {first road side unit and second road side unit}, {first road side unit}, and {second road side unit} from the first group and acquire a subset such as {third road side unit} from the second group. When the first road side unit, the second road side unit, and the third road side unit are the first' group, the road side unit classification unit 1221 may acquire a subset such as {first road side unit, second road side unit, and third road side unit}, {first road side unit and second road side unit}, {first road side unit and third road side unit}, {second road side unit and third road side unit}, {first road side unit}, {second road side unit}, and {third road side unit}.

The road side unit classification unit 1221 may generate input data based on the result of performing the grouping and the subset. The road side unit classification unit 1221 may generate input data of each of the groups classified based on the result of performing the grouping. The road side unit classification unit 1221 may determine the number of channels of input data based on the subset of each of the groups. For example, when the first road side unit and the second road side unit are the first group and when the third road side unit is grouped into the second group, the road side unit classification unit 1221 may generate input data for the first group and the second group. The input data may include channels. The number of channels may be determined based on the number of road side units included in each of the groups and a dimension of traffic data. For example, in a case where the road side unit classification unit 1221 generates input data based on the traffic data of Equation 5, when the dimension of Equation 5 is two-dimensional, the input data for the first group may be one-dimensional data composed of 20 channels, and the input data for the second group may be one-dimensional data composed of 10 channels. Meanwhile, alternatively, when the dimension of the above Equation 5 is one-dimensional, the input data for the first group may be one-dimensional data composed of 20 channels, and the input data for the second group is one-dimensional data composed of 10 channels.

When the first road side unit to the third road side unit are grouped into the first group, the road side unit classification unit 1221 may generate input data for the first' group. The input data for the first' group may be one-dimensional data composed of 30 channels. When the grouping process is completed, all possible subsets including the corresponding road side unit are generated for the road side unit to be subjected to anomaly determination for each group, and input data is generated for this subset. For example, an arbitrary group is composed of three road side units, and all subsets including a specific road side unit may have a total of four. In order for the road side unit classification unit 1221 to detect the anomaly of the $i^{th}$ road side unit, input data generated from an arbitrary subset including the corresponding road side unit may be as shown in the following Equation 9.

$$X_i(t) = \begin{bmatrix} \begin{bmatrix} x_i(t) & \ldots & x_i(t+M-1) \\ x_{j0}(t) & & x_{j0}(t+M-1) \\ \vdots & \ddots & \vdots \\ x_{jG-2}(t) & \ldots & x_{jG-2}(t+M-1) \end{bmatrix} \end{bmatrix} \quad \text{[Equation 9]}$$

In Equation 9, $X_i(t)$ may denote input data. A size of the input data $X_i(t)$ may be $(G \cdot \dim(x_i)) \times M$. G may denote the number of all road side units included in the subset including the $i^{th}$ road side unit. For example, since the road side unit classification unit 1221 generates the input data from the subset including the corresponding road side unit in the first group for the anomaly detection of the first road side unit, G may be 1 and 2, and since the input data is generated from the subset including the corresponding road side unit in the first' group, G may be 1, 2, and 3. $\dim(x_i)$ may denote a dimension of traffic data. When the road side unit classification unit 1221 generates the input data based on the traffic data of the above Equation 5, the input data for the first group may be two-dimensional data composed of 20 channels, and the input data for the second group may be two-dimensional data composed of 10 channels. $\dim(x_i)$ may be 10.

$(G \cdot \dim(x_i))$ may be the number of channels of the input data. The number of rows of the input data $X_i(t)$ may be the number of channels $(G \dim(x_i))$ of the input data $X_i(t)$, and the number of columns of the input data $X_i(t)$ may be equal to the number of traffic data. When the input data $X_i(t)$ is generated based on the traffic data of Equation 5, the number of columns of the input data $X_i(t)$ may be n. The road side unit classification unit 1221 may transmit input data to the artificial neural network 1222. The input data may be received from the road side unit classification unit 1221. The input data $(X_i(t))$ may be data in which a one-dimensional signal having a length of M is composed of $(G \cdot \dim(x_i))$ channels, and the artificial neural network 1222 receiving the data is configured as follows.

Figure 4:
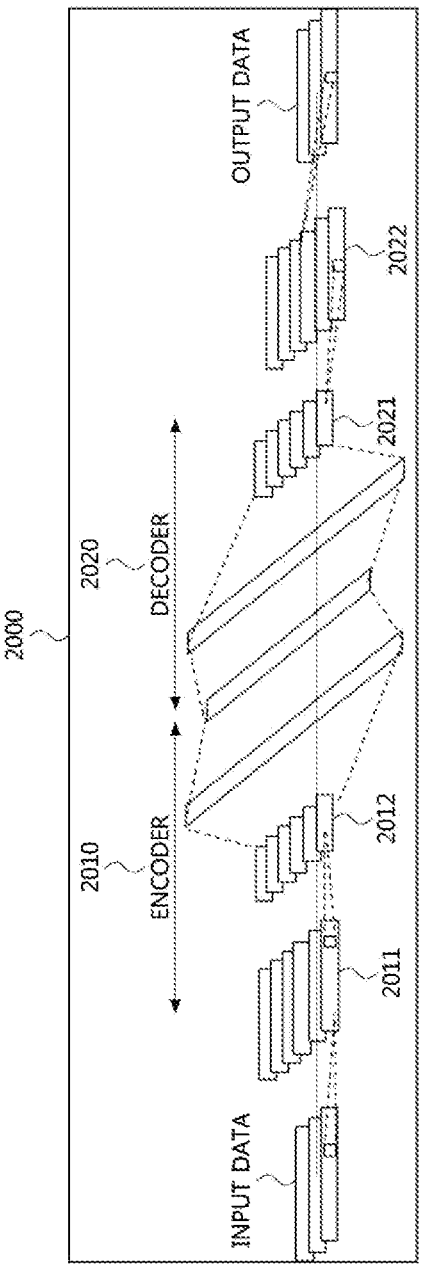
FIG. 4 is a conceptual diagram of an artificial neural network according to an exemplary embodiment of the present disclosure.

FIG. 4 is a conceptual diagram of an artificial neural network according to an exemplary embodiment of the present disclosure.

Referring to FIG. 4, an artificial neural network 2000 may be the artificial neural network 1222 in FIG. 3. The artificial neural network 2000 may include an encoder 2010 and a decoder 2020. The encoder 2010 and the decoder 2020 may include structures that are mutually symmetrical. The artificial neural network 2000 may be a convolutional autoencoder (CAE), but this is only an example, and when the encoder 2010 and the decoder 2020 have a mutually symmetrical structure, the artificial neural network 2000 is not limited to the CAE. In addition, the encoder 2010 and the decoder 2020 may be fully connected.

The encoder 2010 may include one or more convolution layers 2011 and one or more pooling layers 2012. The encoder 2010 may encode the input data. The encoding may be performed. The encoder 2010 may be a layer that performs a process (encoding process) of forming hidden layers by compressing input data among a plurality of layers constituting the artificial neural network 2000. Parameters for the encoder 2010 to perform encoding may be $a_1, a_2, \ldots, a_N$.

The decoder 2020 may include one or more unpooling layers 2021 and one or more transposed convolutional layers 2022. The decoder 2020 may perform decoding on the encoded input data. The decoder 2020 may be a layer that performs a process of generating output data from the hidden layer. Parameters for the decoder 2020 to perform decoding may be $b_1, b_2, \ldots, b_N$. The one or more convolutional layers 2011 and the one or more transposed convolutional layers 2022 may include a mutually symmetrical structure, and one or more pooling layers 2012 and one or more unpooling layers 2021 may include a mutually symmetrical structure.

The convolutional layers 2011 may be a layer that extracts a feature (also referred to as a feature map) by convolution of an input image with a filter. An interval value for which the convolution is performed may be referred to as a stride, and a feature map having a different size may be extracted according to a stride value.

The pooling layers 2012 are layers in which subsampling or pooling is performed on the extracted feature map to select a feature representing the feature map, and max pooling for extracting the largest value for a certain area of the feature map, average pooling for extracting an average value, etc., may be performed. The unpooling layers 2021 may be layers in which an opposite process of the pooling layer 2012 is performed, and the transposed convolutional layers 2022 may be layers in which an opposite process of the convolutional layers 2011 performed by the encoder 2010 is performed.

Figure 5:
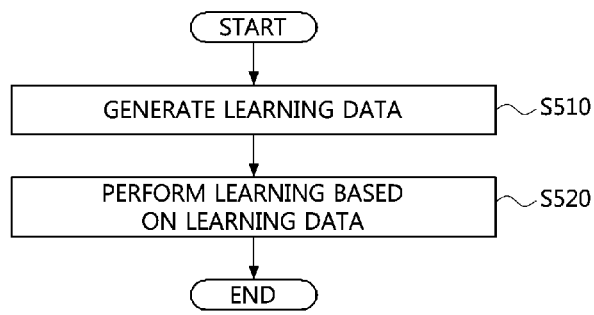
FIG. 5 is a flowchart of a method of learning an artificial neural network according to an exemplary embodiment of the present disclosure.

FIG. 5 is a flowchart of a method of learning an artificial neural network according to an exemplary embodiment of the present disclosure.

Referring to FIG. 5, an artificial neural network (for example, the artificial neural network 2000 in FIG. 5) may generate learning data (S510). The artificial neural network may acquire a plurality of data sets including input data and an actual output value corresponding to the input data. The artificial neural network may classify a plurality of data sets into training sets, a validation set, and a test set.

The artificial neural network may perform learning based on the learning data (S520). The artificial neural network may perform learning by minimizing a loss function as in the following Equation 10.

$$MSE = \frac{1}{\Theta} \sum_n \left\| X^{(n)} - \hat{X}^{(n)} \right\|_F^2 \quad \text{[Equation 10]}$$

In Equation 10, a means square error (MSE) may denote a loss function, $\Theta$ may denote the number of training sets, $X^{(n)}$ may denote an actual output value for input data, and $\hat{X}(n)$ may denote an output value of an artificial neural network for input data. The artificial neural network may perform the training on the artificial neural network based on the training sets. The artificial neural network may perform training by adjusting the parameters ($a_1, a_2, \ldots, a_N$) of the encoder (for example, the encoder 2010 in FIG. 4) and the parameters ($b_1, b_2, \ldots, b_N$) of the decoder 2020. After performing the training by the training set, the artificial neural network may verify the result of performing the training based on the verification set. The artificial neural network may verify the result of performing the training based on the test set. Meanwhile, the learning of the artificial neural network may use an optimization algorithm such as stochastic gradient descent and ADAM, but this is obvious to those skilled in the art and, therefore, will be omitted herein.

Alternatively, the artificial neural network may transform each piece of multidimensional data constituting the training sets, the verification set, and the test set into one dimension. The artificial neural network may perform machine learning based on the transformed training sets and the validation set. The artificial neural network may perform machine learning in a way of minimizing the loss function. The learning of the artificial neural network may use algorithms such as an autoencoder (AE), variational autoencoder (VAE), one-class support vector machine (SVM), and isolation forest (IF), but this is obvious to those skilled in the art and, therefore, will be omitted herein.

For the anomaly detection of the $i^{th}$ road side unit, the following process may be performed. First, for a group including the corresponding road side unit, all subsets including the corresponding road side unit may be generated. A neural network may be trained by collecting training data corresponding to each subset. After all learning is completed, the anomaly detection may be performed using a neural network corresponding to each subset. In this case, referring to FIG. 3, the anomaly detection unit 1223 may receive output data from the artificial neural network 1222. The anomaly detection unit 1223 may acquire an error value as shown in the following Equation 11 based on the value of the output data.

$$MSE_{i,q}(t) = \frac{1}{M} \sum_{m=0}^{M-1} \left\| X_{i,q}(t+m) - \hat{X}_{i,q}(t+m) \right\|^2 \quad \text{[Equation 11]}$$

In Equation 11, $MSE_{i,q}(t)$ may denote an error value for input and output data of the $i^{th}$ road side unit belonging to a $q^{th}$ subset, and M may denote a column size of the input data (or output data). The anomaly detection unit 1223 may determine the anomaly of the road side unit based on the error value. Specifically, the anomaly detection unit 1223 may calculate the error value of the above Equation 11 for all subsets including the $i^{th}$ road side unit and determine that an error has occurred in the $i^{th}$ road side unit when the number of neural networks outputting an error value exceeding a preset value is greater than or equal to a specific number.

For example, when the anomaly detection unit 1223 determines the anomaly of the road side unit based on the first output data, the anomaly detection unit 1223 may acquire the error value based on the output data corresponding to the input data for the first road side unit among the pieces of the first input data and determine the anomaly of the first road side unit based on the error value. The input data for the first road side unit among the pieces of the first input data may be data of channels corresponding to {first road side unit and second road side unit} and {first road side unit} among the subsets of the first group. When the error values calculated based on the output values corresponding to the data of the corresponding channel exceed a preset value, the anomaly detection unit 1223 may determine that the anomaly has occurred in the first road side unit.

When the anomaly detection unit 1223 determines the anomaly of the road side unit based on the first output data, the anomaly detection unit 1223 may acquire the error value based on the output data corresponding to the input data for the second road side unit among the pieces of the first input data and determine the anomaly of the second road side unit based on the error value. The input data for the second road side unit among the pieces of the first input data may be data of channels corresponding to {first road side unit and second road side unit} and {first road side unit} among the subsets of the first group. The anomaly detection unit 1223 may acquire an error value based on the second output data, and determine the anomaly of the third road side unit based on the error value. When the error values calculated based on the output values corresponding to the data of the corresponding channel exceed a preset value, the anomaly detection unit 1223 may determine that the anomaly has occurred in the third road side unit.

When the anomaly detection unit 1223 determines the anomaly of the road side unit based on the first' output data, the anomaly detection unit 1223 may calculate the error value based on the output data corresponding to the input data for the first road side unit among the pieces of the first input data and determine the anomaly of the first road side unit based on the error value. The input data for the first road side unit among the pieces of the first' input data may be data of channels corresponding to {first road side unit, second road side unit, and third road side unit}, {first road side unit and second road side unit}, {first road side unit and third road side unit}, and {first road side unit} among the subsets of the first' group. When the error values calculated based on the output values corresponding to the data of the corresponding channel exceed a preset value, the anomaly detection unit 1223 may determine that the anomaly has occurred in the first road side unit.

When the anomaly detection unit 1223 determines the anomaly of the second road side unit based on the first' output data, the anomaly detection unit 1223 may acquire the error value based on the output data corresponding to the input data for the second road side unit among the pieces of the first' input data and determine the anomaly of the second road side unit based on the error value. The input data for the second road side unit among the pieces of the first' input data may be data of channels corresponding to {first road side unit, second road side unit, and third road side unit}, {first road side unit and second road side unit}, {second road side unit and third road side unit}, and {second road side unit} among the subsets of the first' input group. When the error values acquired based on the output values corresponding to the data of the corresponding channel exceed a preset value, the anomaly detection unit 1223 may determine that the anomaly has occurred in the second road side unit.

In addition, when the anomaly detection unit 1223 determines the anomaly of the third road side unit based on the first' output data, the anomaly detection unit 1223 may acquire the error value based on the output data corresponding to the input data for the third road side unit among the pieces of the first' input data and determine the anomaly of the third road side unit based on the error value. The input data for the third road side unit among the pieces of the first' input data may be data of channels corresponding to {first road side unit, second road side unit, and third road side unit}, {first road side unit and third road side unit}, {second road side unit and third road side unit}, and {third road side unit} among the subsets of the first' group. When the error values acquired based on the output values corresponding to the data of the corresponding channel exceed a preset value, the anomaly detection unit 1223 may determine that the anomaly has occurred in the third road side unit.

Figure 6:
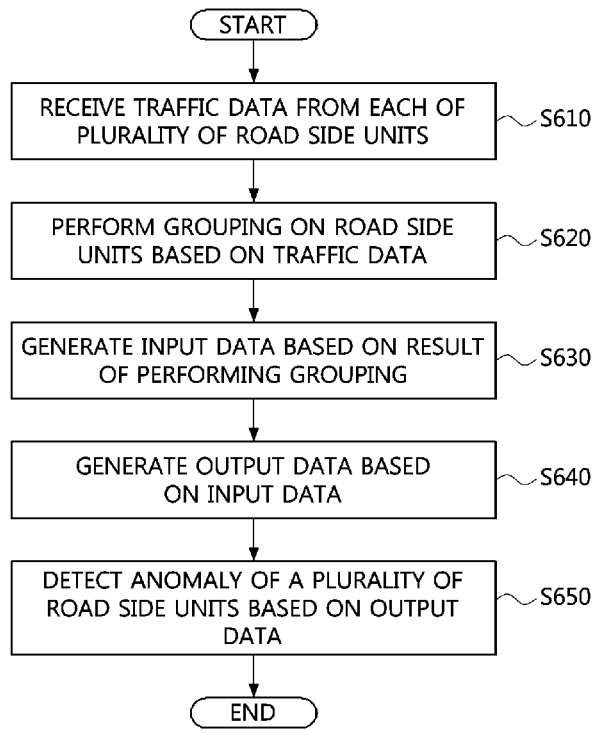
FIG. 6 is a flowchart of an anomaly detection method according to an exemplary embodiment of the present disclosure.

FIG. 6 is a flowchart of an anomaly detection method according to an exemplary embodiment of the present disclosure.

Referring to FIG. 6, an anomaly detection device (for example, anomaly detection device 1220 in FIG. 1) may receive traffic data from each of the road side units (for example, road side units 1210-1 to 1210-3 in FIG. 1) (S610). For example, the anomaly detection device may receive first traffic data from the first road side unit (for example, the first road side unit 1210-1 in FIG. 1), receive second traffic data from the second road side unit (for example, the second road side unit 1210-2 in FIG. 1), and receive third traffic data from the third road side unit (for example, the third road side unit 1210-3 in FIG. 1).

The anomaly detection device may group the road side units based on the traffic data (S620). The road side unit classification unit (for example, a road side unit classification unit in FIG. 3) of the anomaly detection device may calculate an absolute Pearson correlation distance between road side units based on traffic data. For example, the road side unit classification unit may calculate the absolute Pearson correlation distance between the first road side unit, the second road side unit, and the third road side unit based on the first traffic data, the second traffic data, and the third traffic data. The road side unit classification unit 1221 may group the road side units based on the absolute Pearson correlation distance. For example, when the absolute Pearson correlation distance between the first road side unit and the second road side unit is less than or equal to a preset distance, the road side unit classification unit may group the first road side unit and the second road side unit into the same first group, and when the absolute Pearson correlation distance of the first road side unit and the third road side unit and the absolute Pearson correlation distance between the second road side unit and the third road side unit exceed a preset distance, group the third road side unit into the second group. In addition, the road side unit classification unit may group the predetermined number of road side units into the same group by viewing the absolute Pearson correlation distance in ascending order. For example, when the predetermined number of road side units is three, the anomaly detection device may group the first road side unit, the second road side unit, and the third road side unit into the same first' group.

The anomaly detection device may generate input data based on the result of performing the grouping (S630). The road side unit classification unit may generate input data based on the result of performing the group. The input data may be input data of the artificial neural network of the anomaly detection device (for example, the artificial neural network 1222 in FIG. 3). For example, when the first road side unit and the second road side unit are the first group and when the third road side unit is the second group, the road side unit classification unit may generate first input data based on the first traffic data and the second traffic data and generate second input data based on the third traffic data. In addition, when the first road side unit, the second road side unit, and the third road side unit are the first' group, the road side unit classification unit my generate first' input data based on the first traffic data, the second traffic data, and the third traffic data. The road side unit classification unit 1221 may transmit input data to the artificial neural network 1222.

The anomaly detection device may generate output data based on the input data (S640). The artificial neural network may receive input data from the road side unit classification unit. The artificial neural network may generate output data based on the input data. For example, the artificial neural network may generate first output data based on the first input data, generate second output data based on the second input data, and may generate first' output data based on the first' input data. The artificial neural network may transmit the output data to the anomaly detection unit (for example, the anomaly detection unit 1223 in FIG. 3).

The anomaly detection device may detect an anomaly of one or more road side units based on the output data (S650). The anomaly detection unit may receive output data from the artificial neural network. The anomaly detection unit may calculate an error value based on the output data. For example, the anomaly detection unit may calculate an error value for the first road side unit and an error value for the second road side unit based on the first output data and calculate an error value for the third road side based on the second output data. The anomaly detection unit may calculate error values for the first road side unit, the second road side unit, and the third road side unit based on the first' output data. The anomaly detection unit may determine the anomaly of the road side unit by comparing the error value with a preset value. For example, the anomaly detection unit may determine that the anomaly has occurred in the first road side unit when the error value for the first road side unit exceeds a preset value, determine that the anomaly has occurred in the second road unit when the error value for the second road side unit exceeds a preset value, and determine that the anomaly has occurred in the third road unit when the error value for the third road side unit exceeds a preset value. Meanwhile, one or more vehicles 1111 to 1119, road side units 1210-1 to 1210-3, and anomaly detection device 1220 in FIG. 1 may be a communication node, and the communication node may be configured as follows.

Figure 7:
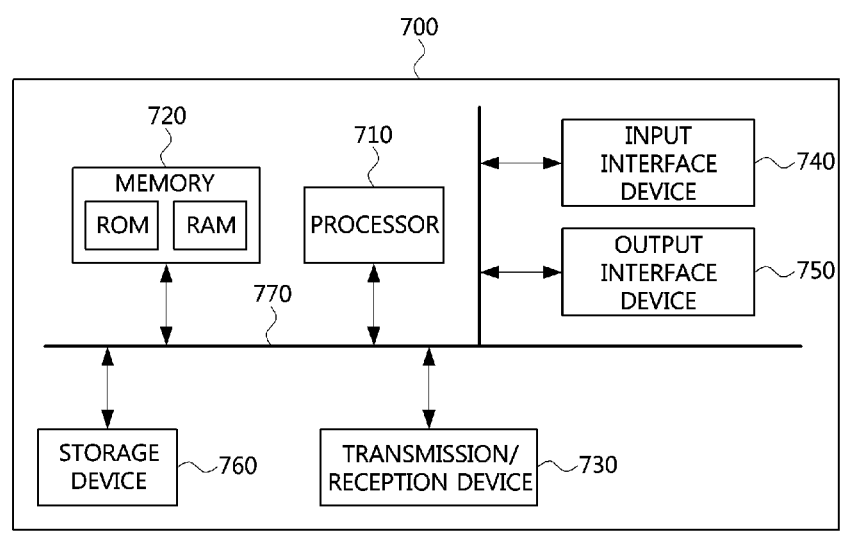
FIG. 7 is a block diagram illustrating a communication node according to an exemplary embodiment of the present disclosure.

FIG. 7 is a block diagram illustrating a communication node according to an exemplary embodiment of the present disclosure.

Referring to FIG. 7, a communication node 700 may be one of the one or more vehicles 1111 to 1119, the road side units 1210-1 to 1210-3, and the anomaly detection device 1220. The communication node 700 may comprise at least one processor 710, a memory 720, and a transceiver 730 connected to the network for performing communications. Also, the communication node 700 may further comprise an input interface device 740, an output interface device 750, a storage device 760, and the like. Each component included in the communication node 700 may communicate with each other as connected through a bus 770.

However, each component included in the communication node 700 may be connected to the processor 710 via an individual interface or a separate bus, rather than the common bus 770. For example, the processor 710 may be connected to at least one of the memory 720, the transceiver 730, the input interface device 740, the output interface device 750, and the storage device 760 via a dedicated interface.

The processor 710 may execute a program stored in at least one of the memory 720 and the storage device 760. The processor 710 may refer to a central processing unit (CPU), a graphics processing unit (GPU), or a dedicated processor on which methods in accordance with embodiments of the present disclosure are performed. Each of the memory 720 and the storage device 760 may be constituted by at least one of a volatile storage medium and a non-volatile storage medium. For example, the memory 720 may comprise at least one of read-only memory (ROM) and random access memory (RAM).

According to the present disclosure, it is possible to improve accuracy and performance of an intelligent transport system by detecting an anomaly of a road side unit based on traffic data received from one or more road side units having a correlation with each other.

In addition, according to the present disclosure, it is possible to detect an anomaly of a road side unit in real time and improve performance of an intelligent transport system by detecting the anomaly of the road side unit using an artificial neural network.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some exemplary embodiments, one or more of the most important steps of the method may be executed by such an apparatus.

Although the present disclosure has been described with reference to preferred exemplary embodiments, it will be apparent to those skilled in the art that the present disclosure may be variously changed and modified without departing from the spirit and scope of the disclosure defined in the following claims.

What is claimed is:

1. A method of detecting an anomaly of a road side unit, which is performed by an anomaly detecting apparatus interworking with one or more road side units, the method comprising:

receiving traffic data from each of the one or more road side units;

calculating a distance between the one or more road side units based on the traffic data;

grouping the road side units with the distance, which is less than or equal to a preset value, among the one or more road side units into the same group;

calculating all subsets of groups of the road side units, which are grouped according to the grouping;

generating input data of an artificial neural network from subsets among all the subsets of the groups, to which a first road side unit among the one or more road side units belongs;

generating output data of the artificial neural network based on the input data; and detecting an anomaly of the first road side unit based on the output data.

2. The method of claim 1, wherein the distance is one of a linear distance between the road side units and an absolute Pearson correlation distance between the road side units.

3. The method of claim 1, wherein a size of the input data is determined based on the number of the subsets to which the first road side unit belongs and a size of the traffic data.

4. The method of claim 1, wherein the artificial neural network is pre-trained.

5. The method of claim 1, wherein the artificial neural network is a convolutional auto encoder (CAE).

6. The method of claim 1, wherein the detecting of the anomaly includes:

acquiring error values for the first road side unit based on the output data; and detecting an anomaly of the first road side unit by comparing the error values with a preset value.

7. An apparatus for detecting an anomaly of a road side unit, comprising:

a processor;

a memory configured to store one or more instructions executed by the processor; and an artificial neural network, wherein the one or more instructions are executed to:

receive traffic data from each of one or more road side units;

calculate a distance between the one or more road side units based on the traffic data;

group the road side units with the distance, which is less than or equal to a preset value, among the one or more road side units into the same group;

calculate all subsets of groups of the road side units, which are grouped according to the grouping;

generate input data of the artificial neural network from subsets among all the subsets of the groups, to which a first road side unit among the one or more road side units belongs;

generate, by the artificial neural network, output data based on the input data; and detect an anomaly of the first road side unit based on the output data.

8. The apparatus of claim 7, wherein the distance is one of a linear distance between the road side units and an absolute Pearson correlation distance between the road side units.

9. The apparatus of claim 7, wherein a size of the input data is determined based on the number of the subsets to which the first road side unit belongs and a size of the traffic data.

10. The apparatus of claim 7, wherein the artificial neural network is pre-trained.

11. The apparatus of claim 7, wherein the artificial neural network is a convolutional auto encoder (CAE).

12. The apparatus of claim 7, wherein, in the detection of the anomaly, the one or more instructions are executed to:

acquire error values for the first road side unit based on the output data; and detect an anomaly of the first road side unit by comparing the error values with a preset value.

* * * * *